United States Patent
Joubert et al.

(10) Patent No.: US 7,176,998 B2
(45) Date of Patent: Feb. 13, 2007

(54) LIQUID CRYSTAL DISPLAY DEVICE WITH BIREFRINGENCE COMPENSATOR AND VOLUME HOLOGRAM

(75) Inventors: Cécile Joubert, Orsay (FR); Bertrand Morbieu, Bruges (FR); Laurent Bignolles, Bordeaux (FR)

(73) Assignee: Thales, Paris (FR)

( * ) Notice: Subject to any disclaimer, the term of this patent is extended or adjusted under 35 U.S.C. 154(b) by 28 days.

(21) Appl. No.: 10/344,674

(22) PCT Filed: Aug. 14, 2001

(86) PCT No.: PCT/FR01/02614

§ 371 (c)(1),
(2), (4) Date: Aug. 15, 2003

(87) PCT Pub. No.: WO02/14940

PCT Pub. Date: Feb. 21, 2002

(65) Prior Publication Data

US 2004/0012740 A1  Jan. 22, 2004

(30) Foreign Application Priority Data

Aug. 18, 2000  (FR) .................................. 00 10734

(51) Int. Cl.
*G02F 1/1335* (2006.01)

(52) U.S. Cl. .......................... 349/117; 349/119; 349/92
(58) Field of Classification Search .................. 359/15, 359/566, 569, 576; 349/117
See application file for complete search history.

(56) References Cited

U.S. PATENT DOCUMENTS 5,410,421 A   4/1995  Huignard et al.
5,467,206 A   11/1995 Loiseaux et al.
5,526,063 A   6/1996  Joubert et al.
5,546,200 A   8/1996  Nicolas et al.
5,640,256 A * 6/1997  De Vre et al. ................. 359/3
5,734,447 A   3/1998  Loiseaux et al.
5,801,794 A   9/1998  Lehureau et al.

(Continued)

FOREIGN PATENT DOCUMENTS

EP   0 962 805 A   12/1999

(Continued)

OTHER PUBLICATIONS

Mori et al; "Application for a Negative Birefringence Film to Various LCD Modes"; International Display Research Conference (IDRC), US Santa Ana, CA, SID; vol. Conf. 17; Sep. 15, 1997, pp. M-88-M97, XP000767506.

*Primary Examiner*—Andrew Schechter
*Assistant Examiner*—Richard Kim
(74) *Attorney, Agent, or Firm*—Lowe Hauptman & Berner, LLP

(57) ABSTRACT

A display device comprising a liquid-crystal cell element (20) placed between two polarizers (23, 28) comprising at least one optical structure for compensating for the variations in birefringence of said liquid crystal according to the viewing angle. The optical compensation structure comprises at least one oblique-axis film (25, 26) of polymerized liquid-crystal type suitable for at least partly compensating for the undesirable effects of the natural birefringence of the liquid crystal, combined with a volume hologram (24, 27) of small retardation suitable for improving the compensatability of said film.

20 Claims, 11 Drawing Sheets

U.S. PATENT DOCUMENTS

| | | | |
|---|---|---|---|
| 5,940,050 A | 8/1999 | Joubert et al. | |
| 5,946,114 A | 8/1999 | Loiseaux et al. | |
| 6,014,192 A | 1/2000 | Lehureau et al. | |
| 6,069,728 A | 5/2000 | Huignard et al. | |
| 6,141,071 A * | 10/2000 | Sharp | 349/121 |
| 6,157,471 A * | 12/2000 | Bignolles et al. | 359/15 |
| 6,158,866 A | 12/2000 | Gulli et al. | |
| 6,246,521 B1 | 6/2001 | Delboulbe et al. | |
| 6,262,849 B1 | 7/2001 | Potin et al. | |
| 6,288,805 B1 | 9/2001 | Huignard et al. | |
| 6,356,393 B1 | 3/2002 | Potin et al. | |
| 6,359,671 B1 * | 3/2002 | Abileah | 349/119 |
| 6,384,974 B1 | 5/2002 | Joubert et al. | |
| 6,426,810 B1 | 7/2002 | Joubert et al. | |
| 6,504,658 B1 | 1/2003 | Bignolles et al. | |

FOREIGN PATENT DOCUMENTS

FR     2 754 609 A     4/1998

* cited by examiner

LIQUID CRYSTAL DISPLAY DEVICE WITH BIREFRINGENCE COMPENSATOR AND VOLUME HOLOGRAM The present invention relates to liquid-crystal display devices with compensation of the birefringence, allowing the viewing angle of the display device to be considerably increased.

It applies especially in electrooptic display devices and more specifically in liquid-crystal displays, used in transmission, in reflection or even in projection on a screen.

Liquid-crystal screens have experienced very substantial growth with the development of portable computers using TFT (Thin Film Transistor) technology and a TN (Twisted Nematic) liquid-crystal cell.

Most liquid-crystal displays or screens suffer from a major drawback, namely the limited viewing angle at which they can be observed: upon deviating from the normal to the surface of the display or screen, the contrast between black and white decreases considerably and the image presented deteriorates. This is because, owing to the intrinsic birefringence of the liquid crystal, the contrast level drops as soon as the observer deviates from the normal to the screen and, for certain areas of observation, the gray levels are inverted.

This phenomenon, acceptable for some applications, must absolutely be compensated for when it is a question of producing computer screens or any display devices that can be consulted by several observers at the same time.

The viewing angle properties of a screen or display of the LCD (liquid-crystal display) type are generally evaluated using a conoscope which gives the isocontrast curves as a function of the angle of observation, characterized by the following two angles:

$\theta$=angle of the observer with respect to the normal of the screen;

$\phi$=angle of projection of the direction of observation in the plane of the screen, with respect to the East-West (horizontal) axis.

FIG. 1 depicts the conoscope of an uncompensated TN cell. This conoscope shows that the range of viewing angles for which the contrast for example greater than 50 is small.

The prior art discloses various methods and structures whose objective is to remedy the aforementioned problem.

1) Multidomains

A first approach consists in modifying the structure of the cell by creating, in each elementary cell (pixel), several domains in which the anchoring of the liquid crystal is different. The averaging effect thus obtained reduces the problem substantially, but leads to an increase in the complexity in the process for manufacturing the screen.

2) Novel Electrooptic Effects

A second approach consists in using other types of liquid cells in which the alignment, the nature of the liquid crystal or the addressing principle are different from a TN (twisted nematic). Some of them, such as IPS (In Plane Switching), have resulted in commercial products having properties equivalent to that of a TN and possessing a large viewing angle. However, these cells are based on complex effects which are not always under control in the manufacture of LCD screens.

3) Birefringent Films

A third approach does not modify the structure of the cell but corrects the birefringence of the liquid crystal by adding one or more optimized birefringent films in order to compensate for the effect of the liquid crystal. The compensation philosophy is the following: the problem of the viewing angle of liquid-crystal cells stems from the birefringent character of the liquid crystal, which converts the polarization of light wave differently according to its angle of incidence. Since extinction between cross polarizers is only possible if the output polarization is linear, black is obtained only for angles close to the normal to the screen. The addition of films possessing an "inverse" birefringence makes it possible to reduce, or even eliminate, this birefringence.

Comments on Birefringent Films

A birefringent medium is characterized by its index ellipsoid, the surface characteristic of the index of propagation of a lightwave of given polarization and of given direction: the axes of the intrinsic frame of the ellipsoid constitute the intrinsic axes of the medium and the length of these axes is equal to the index of propagation of the light polarized along the corresponding axis.

If the ellipsoid is of circular cross section, the medium is "uniaxial". For a uniaxial medium, the index along the axis of revolution or optical axis is called the extraordinary index $n_e$ and the index along the other two axes is the ordinary index $n_o$, as depicted in FIGS. 2a and 2b. If the extraordinary index $n_e$ is greater than the ordinary index $n_o$, the medium is called a positive uniaxial medium and the ellipsoid is elongate, in the form of a "cigar" (FIG. 2a). The extraordinary axis is the slow axis. Conversely, if the extraordinary index $n_e$ is less than the ordinary index $n_o$, the medium is called a negative uniaxial medium and the ellipsoid is flattened, in the form of a cushion or "dish" (FIG. 2b). The extraordinary axis is the fast axis.

The difference between these two indices is very small, for example of the order of 1%, but it is sufficient to introduce very large changes in polarization.

The medium is biaxial if the ellipsoid is not a body of revolution, that is to say there are three orthogonal intrinsic axes with three different indices.

The inclination of the optical axis for a uniaxial medium is indicated by the angles $(\theta,\phi)$ in which:

$\theta$ is the angle of the optical axis with respect to a perpendicular to the plane of the screen;

$\phi$ is the projection of the optical axis in the plane of the screen with respect to the east-west direction.

The retardation $R_o$ of a uniaxial film is defined as follows:

$R_o=(n_e-n_o)d$, where d corresponds to the thickness of the film.

If $R_o>0$, the film is called a positive uniaxial film.

If $R_o<0$ the film is called a negative uniaxial film.

Liquid crystals are positive uniaxial media, the optical axis corresponding to the director of the liquid-crystal molecule.

There are many combinations of uniaxially or biaxially based birefringent films allowing the viewing angle of a liquid-crystal cell in general, and a twisted nematic or TN cell in particular, to be improved.

The birefringent films are generally positioned between the polarizers and the substrates of the cell, in various geometrical configurations.

FIG. 3 shows an example of an arrangement of birefringent films for compensating a liquid-crystal cell in terms of viewing angle.

The liquid-crystal cell 1 is positioned between a first assembly formed by a polarizer 10 and by a compensator 11, which consists for example of a birefringent film, and a second assembly formed by a compensator 12 and by an analyzer 13. The reference 14 denotes the substrate of the liquid-crystal cell.

Various methods exist for obtaining birefringent films, some of which are given below by way of illustration but not at all implying any limitation.

Stretched Plastic Film.

By uniaxially or biaxially stretching a plastic film (PVA, short for polyvinyl alcohol, polycarbonate or CTA, short for cellulose triacetate), it is possible to obtain any "in plane" birefringence (negative uniaxial type, positive uniaxial type, biaxial type), that is to say with the axes of the index ellipsoid lying within the plane of the film or along the normal. However, at the present time, this technology does not allow inclined optical axes to be obtained. As it is often necessary to provide birefringent films with optical axis inclined with respect to the plane of the film, the performance of the compensators is limited thereby.

The retardations obtained by this technology are of the order of −100 nm and more. For some orientations of the optical axis of the film, it is difficult with this method to obtain low birefringence values, and to do so reproducibly, for example for values falling within the [−20, −60 nm] range.

Oblique Films

A known effective technique for compensating for the positive-type birefringence of a nematic liquid-crystal cell consists, for example, in using a negative-type birefringent film. For example, in order to compensate a TN cell effectively, it is necessary to provide a negative-type film whose optical axis is inclined with respect to the plane of the substrate.

Fuji Film

It is known to couple, on each side of a TN cell, a continuum consisting of an oblique negative uniaxial medium and an "in-plane" positive uniaxial medium generally obtained by stretching a plastic film. Such a compensation film is disclosed, for example, in U.S. Pat. No. 5,583,679 or in the publication [1] entitled *"Application of a negative birefringence film to various LCD modes"* by N. Mori et al, Proceedings SID 97, pp 11–88.

The inclined negative uniaxial medium continuum is obtained using polymerized discotic liquid-crystal molecules. This method of compensation has given rise to a film sold by Fuji and denoted in the rest of the description by "Fuji film".

The Fuji-type solution therefore comprises a continuum of a negative uniaxial medium consisting of a splay of polymerized discotic liquid-crystal molecules and of a negative uniaxial medium of optical axis perpendicular to the substrate obtained via a plastic (CTA) film, which is also the substrate of the polarizers used in display, as explained in the aforementioned publication [1].

In its current commercial version, the Fuji film consists of a stack comprising a CTA (cellulose triacetate) and of a layer of polymerized discotic molecules, this being depicted in FIG. 4.

The CTA substrate 20 of the Fuji film is a stretched plastic film of the negative uniaxial type, the optical axis of which is perpendicular to the plane of the layers. To use the Fuji film correctly, it has to be combined with a polarizer that itself has a CTA substrate of well-defined retardation, the CTA of the polarizer and the CTA of the Fuji film being bonded together. The values of the CTA retardations are around −40 nm for example.

The multilayer recommended by Fuji for obtaining good compensation must include a layer of polymerized discotic molecules 21 and a negative uniaxial film of optical axis perpendicular to the plane of −80 nm retardation.

The structure of the layer of polymerized discotic molecules is illustrated schematically in FIG. 4.

The Fuji film is a compensation film developed for compensating a TN liquid-crystal film having a thickness d of 4.7 μm. The liquid-crystal molecules become increasingly inclined on going away from the polarizer. Their optical axes are initially inclined at an angle α of 4° to the normal to the surface, attaining a final angle of inclination of 68°. Each film compensates a liquid-crystal half-cell. The compensation of such a liquid-crystal cell therefore requires the use of a Fuji film placed on each side of the cell.

The compensation principle is based on the fact that since the discotic molecules have the reverse birefringence of the nematic molecules constituting the liquid-crystal cell, each discotic molecule compensates for a nematic molecule of parallel optical axis.

FIG. 5 shows the isocontrast curves for a liquid-crystal cell compensated by a film sold by Fuji. A Fuji-type film is placed on either side of the liquid-crystal cell.

Holography

Another method for obtaining a negative uniaxial medium is based on the use of a holographic grating. When the fringe spacing is small enough compared with the illumination wavelength, the hologram operates in form birefringence mode and is equivalent to a negative-type uniaxial medium whose optical axis is coincident with the normal to the fringe plane. Such a correction method is described, for example, in the patents FR 2 754 609 and FR 2 778 000 or else in the document entitled *"TN-LCD viewing angle compensation with holographic volume gratings"* by C. Joubert et al., Photonic West '99 SPIE Proceedings, No. 3635, 137-142 (1999).

4) Improvement of Films

The properties of the abovementioned films, in particular the Fuji film using polymerized discotic molecules, may also be improved by adding a film of small retardation, of around 20 to 50 nm, with a given orientation. Thus, it is possible to combine the aforementioned Fuji film with a negative-type film of about −25 nm retardation with the optical axis lying, for example, in the plane of the substrate. A different orientation of the optical axis is also possible. An example of such a structure is given in the article entitled *"Improvement of the optical characteristics of a twisted-Nematic Display using negative in plane and splayed discotic films"*, Proceedings of the SID '98, p. 694 by T. A. Sergan and J. R. Kelly. This article recommends the use of a stretched film in the plane having an optical axis lying within the plane of the screen.

The concept of the invention consists especially in combining a volume hologram with a Fuji-type compensation film so as to improve the compensatability of the film. In particular, the characteristics of the volume hologram are chosen depending on the film whose compensatability is to be improved.

The invention considers an optical axis of any inclination for the film.

The invention also opposes, in addition to using a holographic film, to optimize the CTA of the Fuji film, the combination of the two improvements (holographic film+ CTA optimization) very substantially improving the performance of the Fuji film.

The present invention relates to a display device comprising a liquid-crystal cell element placed between two polarizers, comprising at least one optical structure for compensating for the variations in birefringence of said liquid crystal according to the viewing angle. It is characterized in that said optical compensation structure comprises at least one oblique-axis film of polymerized liquid-crystal type suitable for at least partly compensating for the undesirable effects of the natural birefringence of the liquid crystal, combined with a volume hologram of small retardation suitable for improving the compensatability of said film.

The oblique-axis film may be of the nematic or polymerized discotic liquid-crystal type.

The hologram is, for example, a holographic film having an optical axis in the plane of the oblique-axis film or else a holographic film having an optical axis tilted with respect to the plane of this film.

The value of the retardation of the said volume hologram, expressed in absolute value, is for example less than −150 nm, preferably between −10 and −100 nm.

The holographic assembly may consist of at least two holographic films each comprising a multilayer grating the layers of which have their own orientation.

According to one embodiment, the oblique-axis film comprises, for example, a stretched plastic film of the CTA type having a negative uniaxial birefringence and in that the retardation value of this film is tailored to the holographic film and to the oblique-axis film.

The liquid-crystal cell is, for example, of the twisted nematic type.

The device according to the invention is used, for example, to compensate for the birefringence effects in display devices such as microcomputer screens.

The invention has in particular the advantage of improving the compensation provided by the existing birefringent films used in structures for compensating for birefringence effects.

Further advantages and features of the invention will become apparent on reading the detailed description which follows and which is given with reference to the appended drawings in which:

FIG. 1 shows the conoscope of an uncompensated TN cell;

FIGS. 2a and 2b, the ellipsoids of a positive-type uniaxial medium and a negative-type uniaxial medium, respectively;

Figure 5:
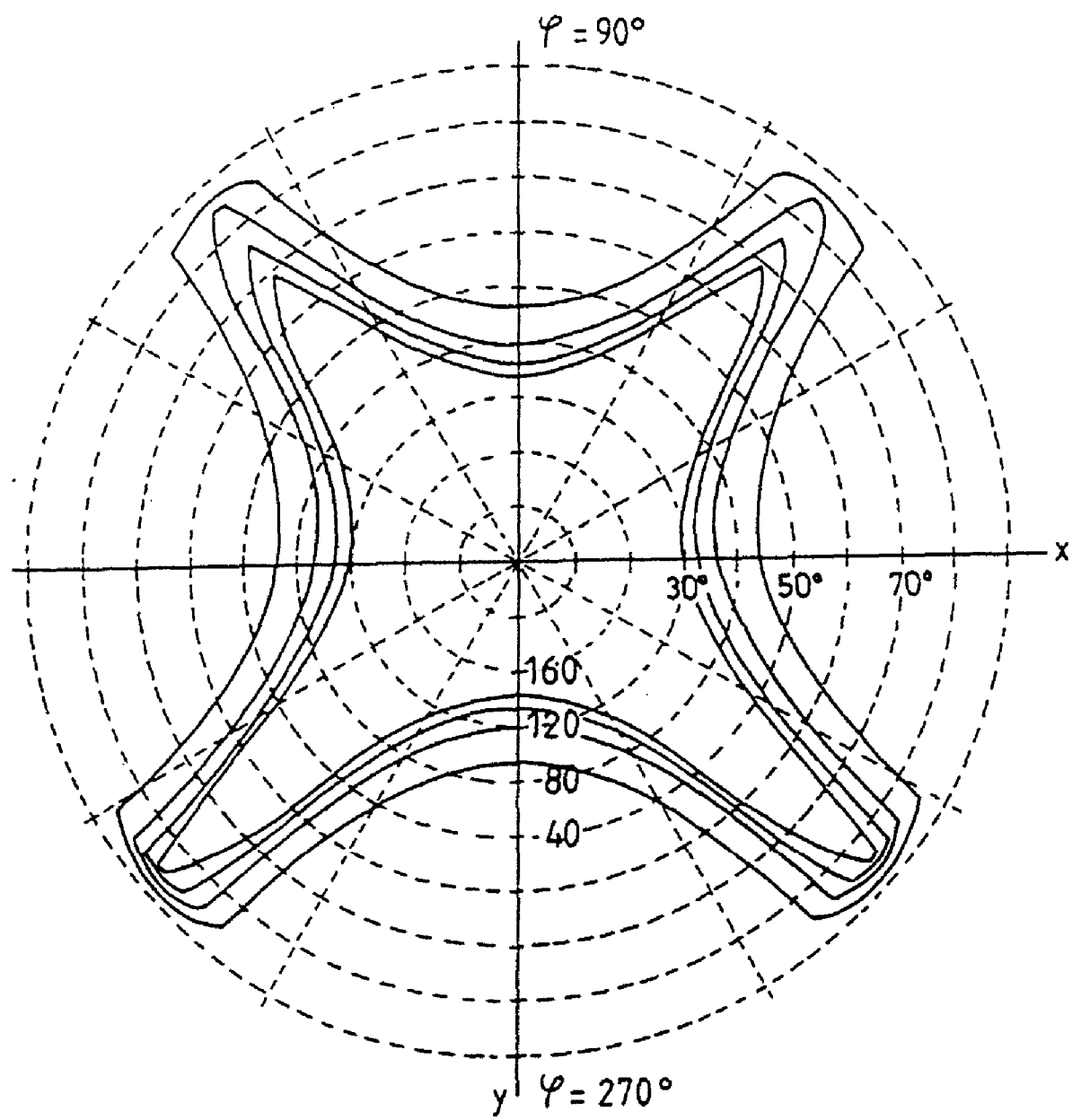
Figure 6:
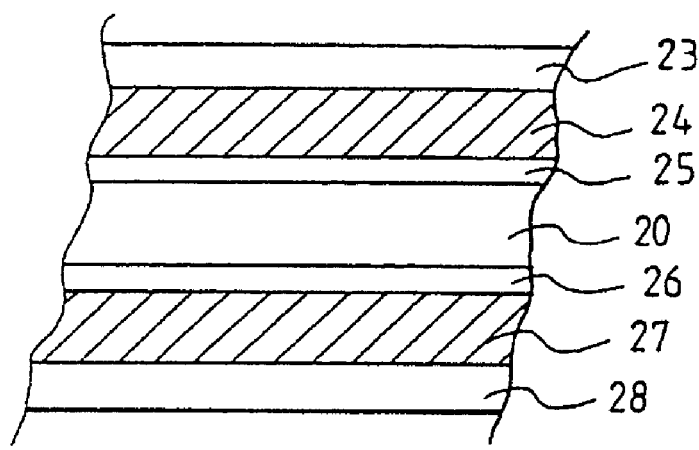
Figure 7:
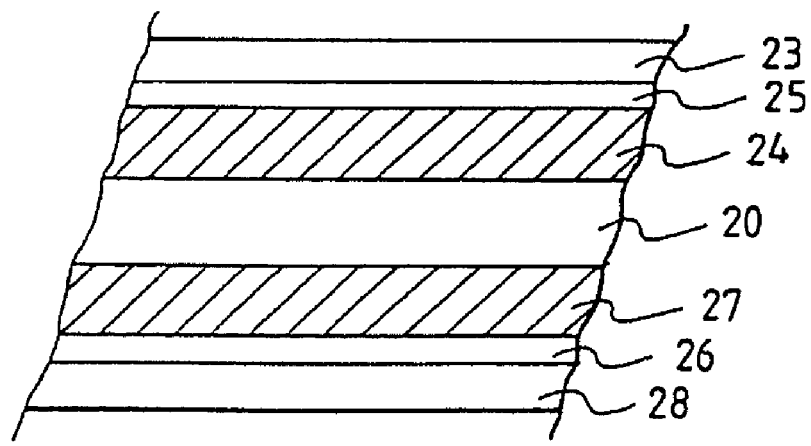
Figure 7:
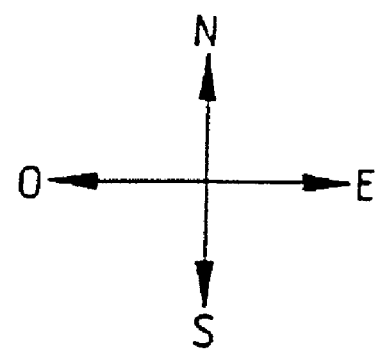
Figure 8:
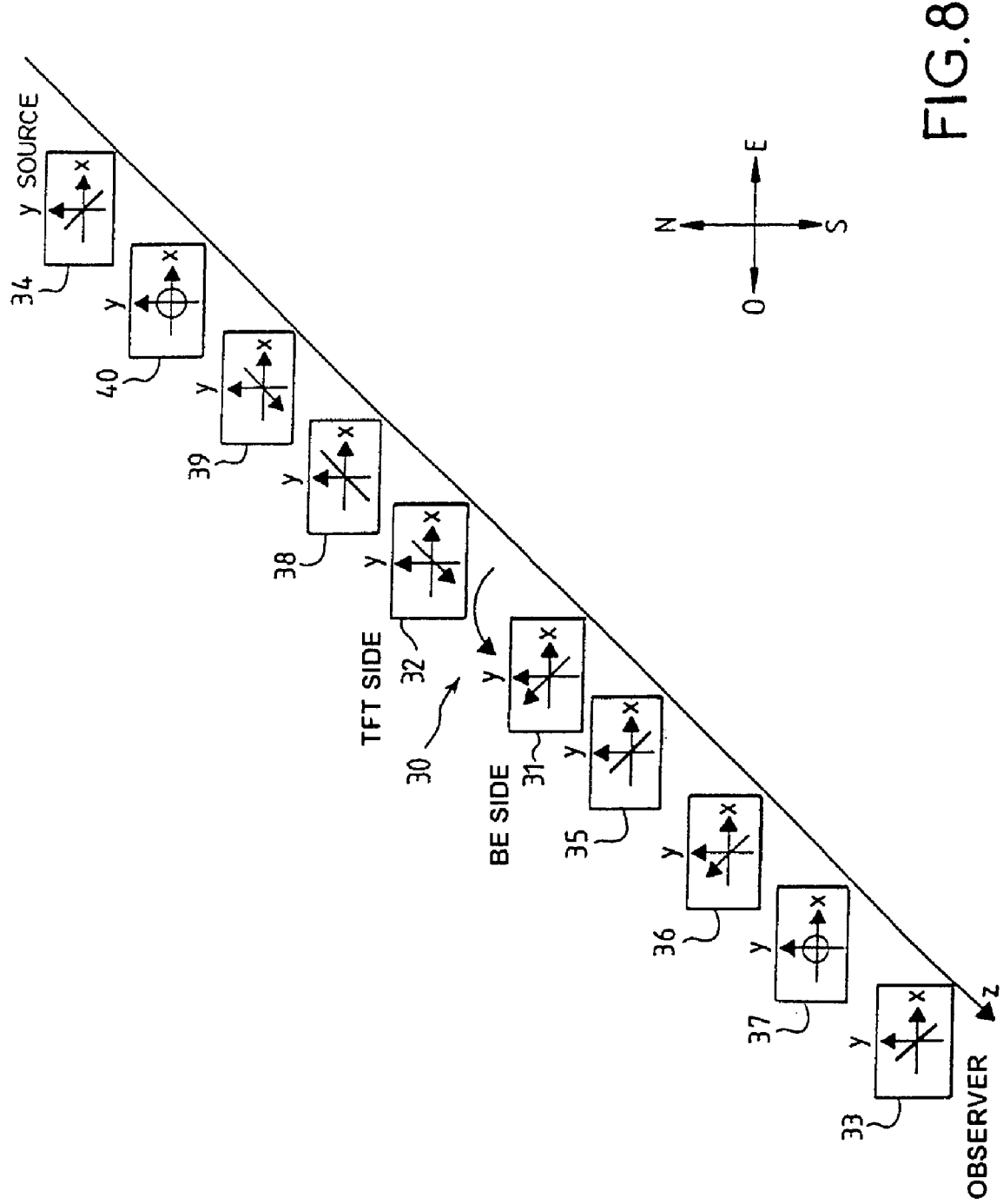
Figure 9:
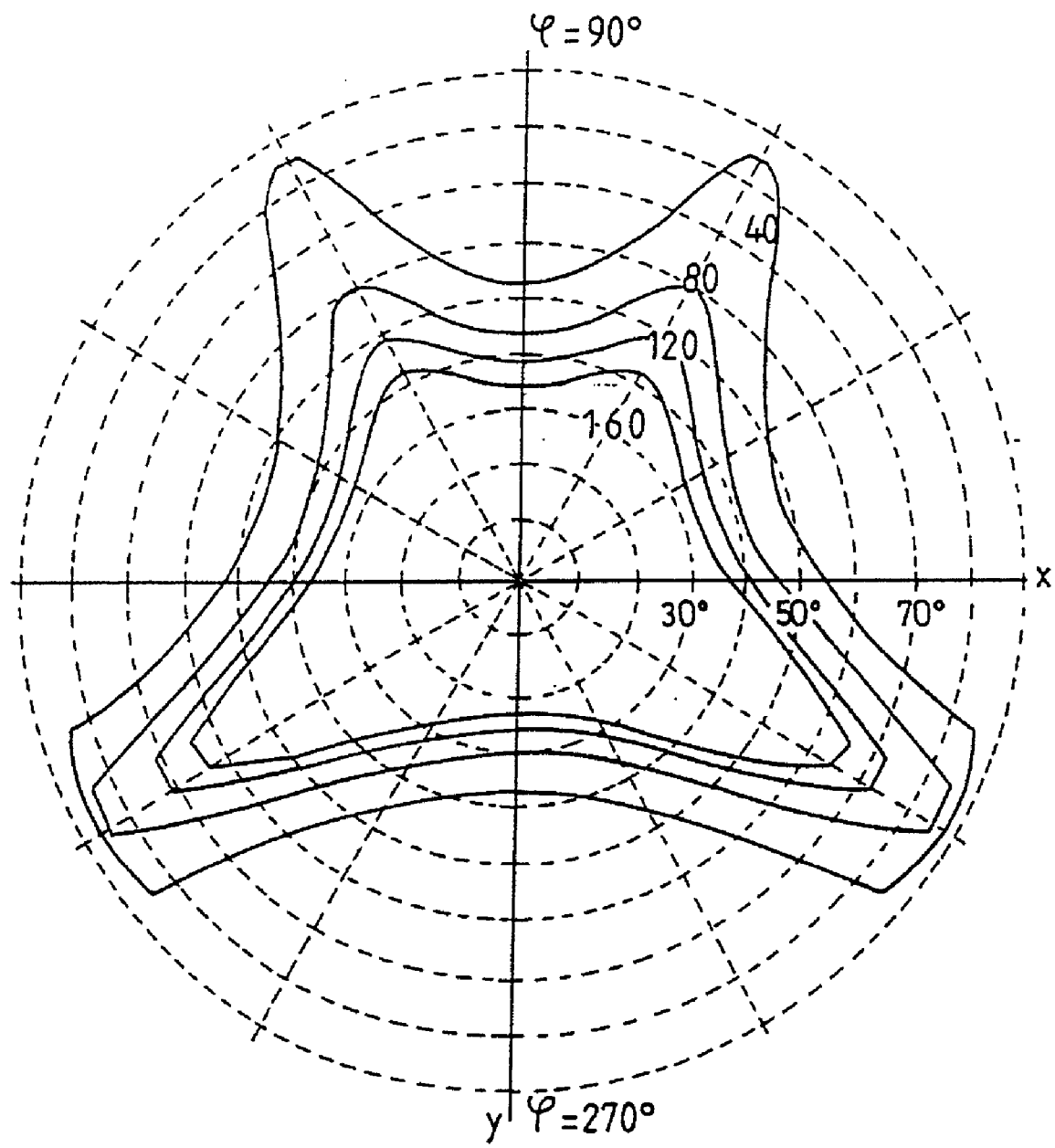
Figure 10:
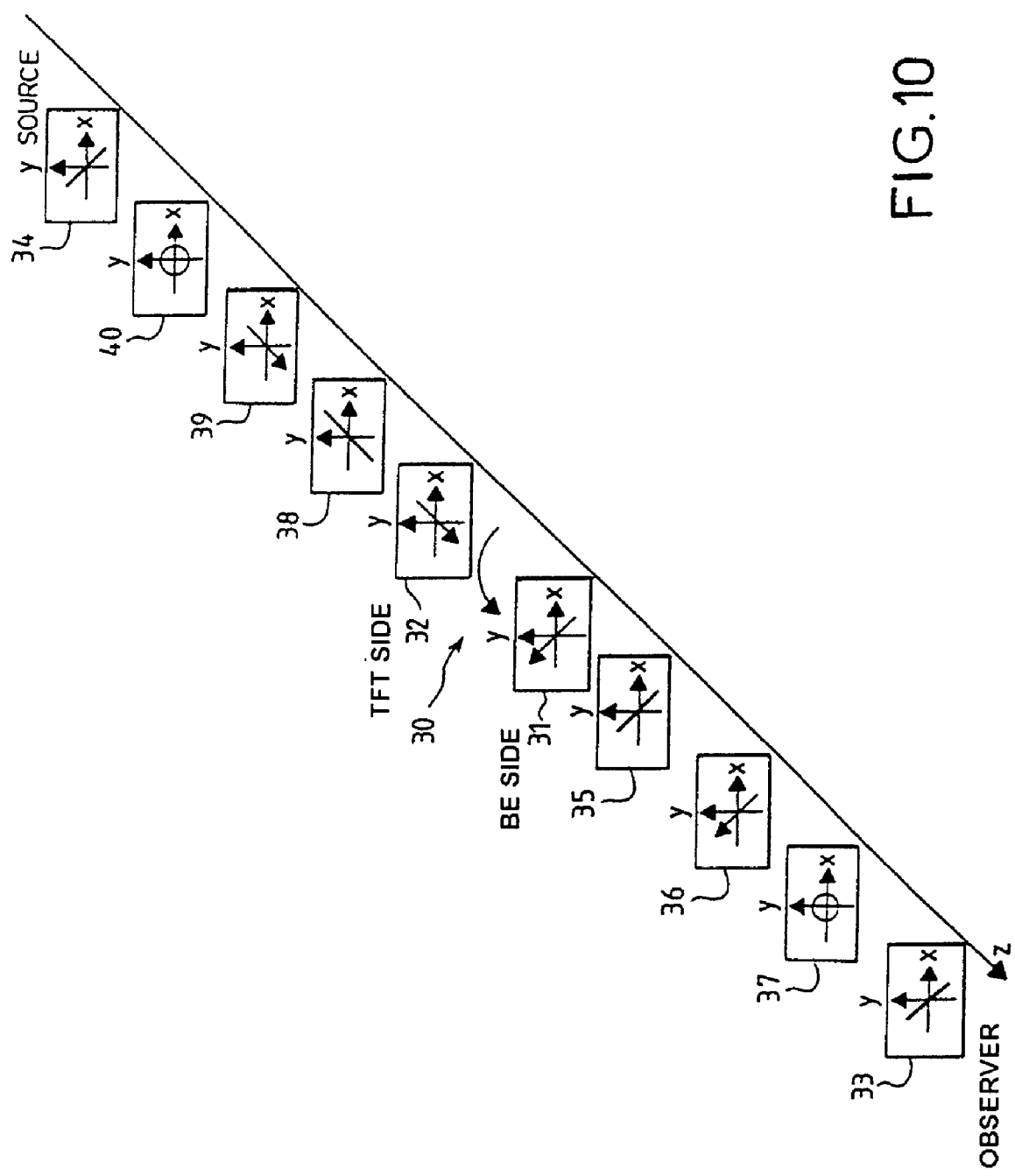
Figure 11:
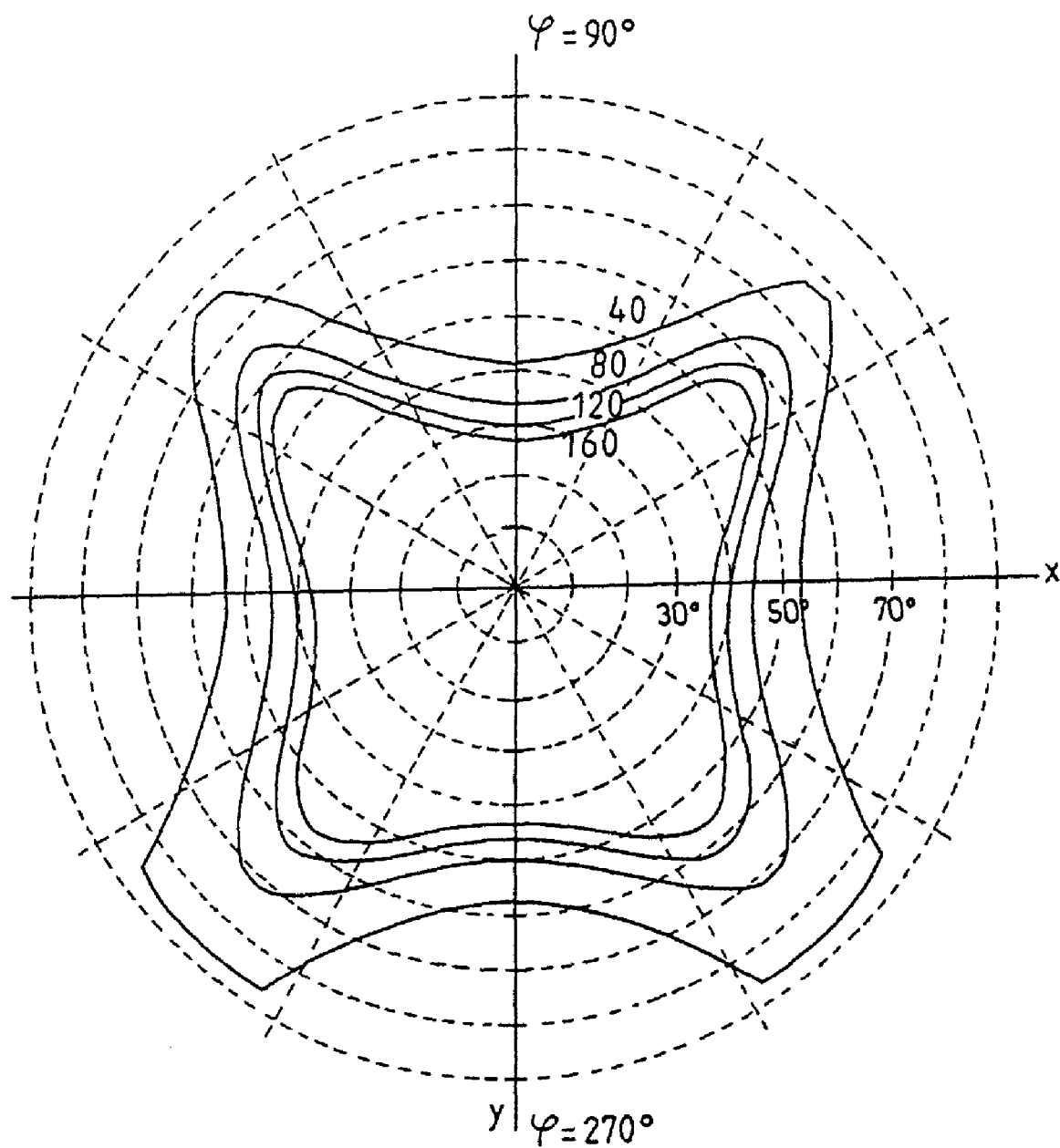
Figure 12:
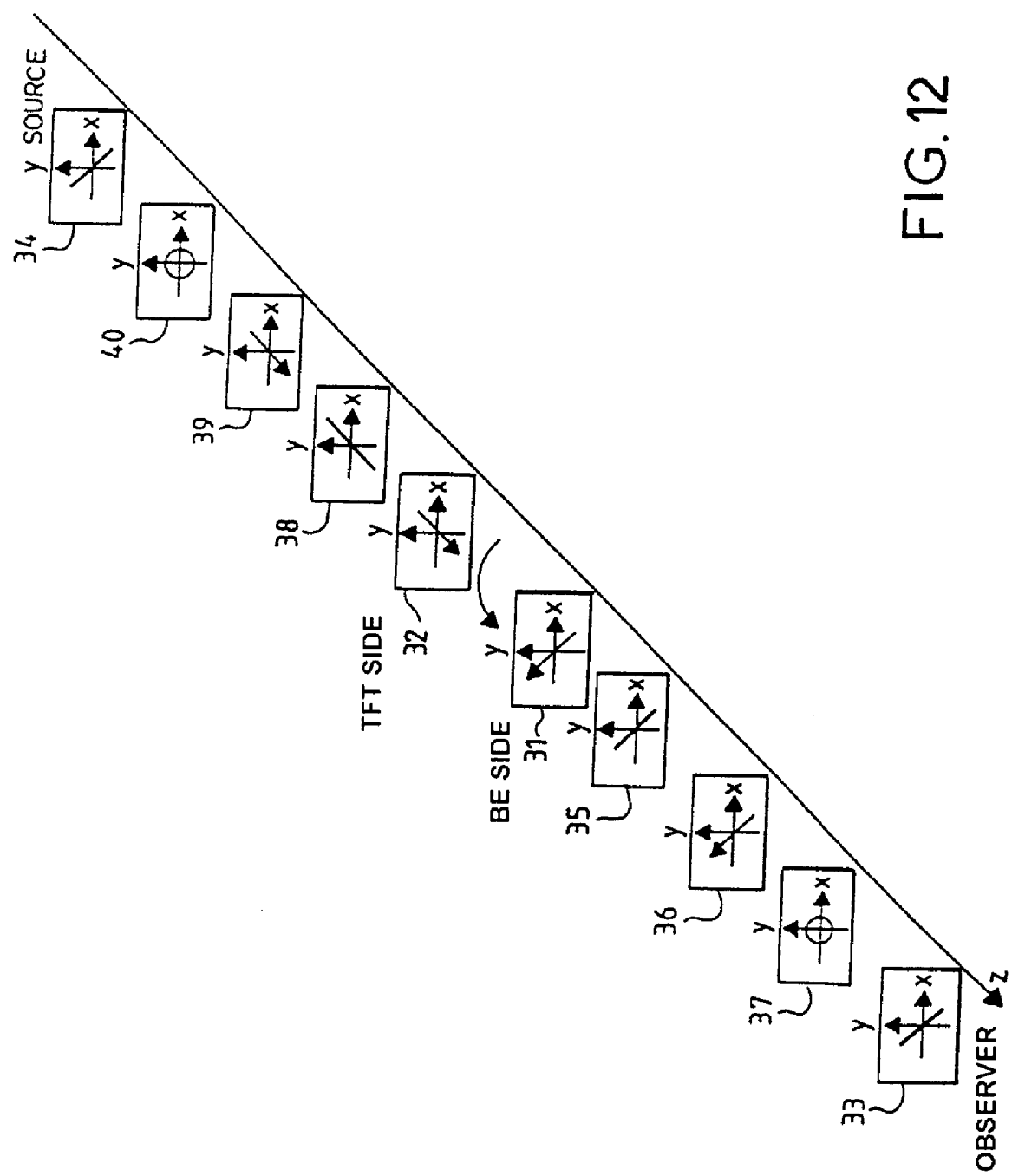
Figure 13:
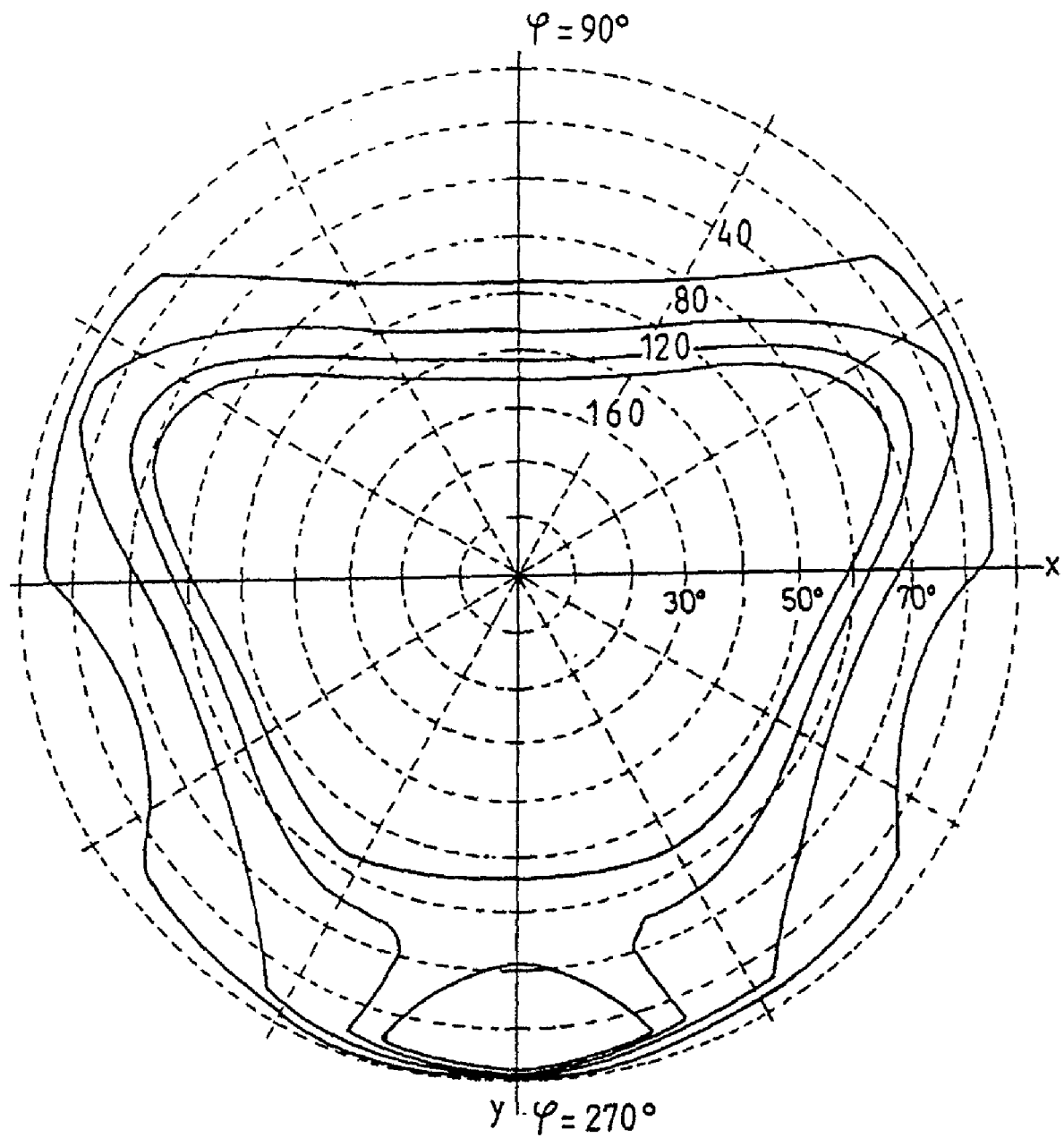

FIG. 5 a conoscope obtained for a liquid-crystal cell compensated using such a film;

FIG. 6 depicts a first scheme for a cell compensated using a structure according to the invention;

FIG. 7 is a second scheme for a cell compensated according to the invention;

FIG. 8 is an exploded view of the structure depicted in FIG. 6, comprising a Fuji film and a negative uniaxial medium in the holographic plane, and FIG. 9 is the conoscope obtained by this structure;

FIG. 10 is an exploded view of a structure comprising a Fuji film and a holographic oblique negative uniaxial medium, and FIG. 11 the conoscope obtained by this structure;

FIG. 12 is an exploded view of a structure according to the invention comprising a Fuji film having an improved CTA and a holographic oblique negative uniaxial film, and FIG. 13 the conoscope obtained by this structure.

It has been discovered that combining a volume hologram having judiciously determined parameters with a film of inclined optical axis or oblique axis, such as the Fuji film, considerably improve the compensatability of the film. In addition, optimizing the CTA of the Fuji film also improves the conoscope obtained with the Fuji/hologram compensation structure.

FIG. 6 shows in a simplified manner an example of such a construction. The orientation of the device is made with respect to the East-West and North-South directions indicated at the bottom of the figure.

The liquid-crystal screen 20 comprises, for example, a twisted nematic liquid crystal. This liquid crystal is sandwiched between two glass plates 21 and 22 (not shown in this figure), the faces of the plates that are in contact with the liquid crystal having been treated by rubbing so as to define the orientation of the molecules in contact with these faces and their tilt with respect to the plane of the faces.

The liquid crystal is placed between a first polarizer 23, a volume hologram 24, a first film 25, for example of inclined optical axis, sold by Fuji and a second film 26, substantially identical, for example, to the first film 25, a volume hologram 27 and a second polarizer 28. The two polarizers are oriented, for example, at 90° to each other, possibly to within a few degrees thereof.

The invention also applies to all the compensation films comprising at least one birefringent medium whose optical axes are oblique (with respect to the plane of the liquid-crystal screen) or inclined in the plane of the film, for example films of inclined optical axis of the polymerized nematic liquid-crystal type that are currently not commercialized.

Holographic Film or Negative Uniaxial Film

The volume hologram is a holographic film in which an index grating has been recorded in the volume. In such a film, the optical axis is coincident with the normal to the plane of the index layers.

The characteristics of this holographic film are defined so as in particular to improve the compensatability of the film of inclined optical axis.

The holographic film is equivalent to a negative uniaxial medium and operates in form birefringence mode. It possesses artificial birefringence properties in the case of wavelengths much longer than the spacing of the layers forming the grating. The sinusoidally modulated index layers are spaced apart with a smaller spacing than the wavelength which passes through them. These layers constitute nondiffracting holograms for the light used for the liquid crystal.

The fringes may be created by ultraviolet light interference in a photosensitive material. The recording process used is, for example, described in the Applicant's patent FR 2 778 000.

Retardation of the Film

The equivalent retardation $R_h$ of the holographic grating as a function of the modulation of its refractive index $\Delta n$ is obtained, for example, from the following simple formula:

$$R_o = -\frac{\Delta n^2}{n_o} \times d$$

with
d: thickness of the film
$n_o$: mean index
$\Delta n$: modulation of the refractive index.

For example, a typical value for $\Delta n$ for producing a holographic grating of a photopolymer manufactured by DuPont is equal to 0.045. Taking a typical film thickness of 25 μm and a mean index $n_o > 1.5$, gives a retardation value $R_h$ of −40 nm. The retardation is calculated using the method described for example in the publication entitled "*TN-LCD viewing angle compensation with holographic gratings*" by C. Joubert et al., Photonic West '99, SPIE Proceedings No. 3635, 137–142 (1999).

Each film may have a retardation of less than −150 nm and preferably falling within the [−10 nm to −100 nm] range of values.

Angles

The orientation of the optical axis of the holographic film lies in the plane of the Fuji film or is tilted with respect to the plane of this film. The angle of orientation of the index layers is defined according to the characteristics of the film.

The angle of inclination of the optical axis of a holographic film can make an angle θ of between 0° and 90° with the normal to the plane of this film.

The projection of the optical axis of the holographic films on the plane of the film makes an angle φ of between 0° and 360° for example.

The angles θ and φ associated with each holographic film will be optimized by simulation, in order to produce an effective compensator.

The parameters that it is desired to optimize are especially:
the retardation Rp of the "in plane" negative uniaxial film for an angle θ of approximately 0° (optical axis perpendicular to the plane of the screen);
three values ($R_F$, $\theta_F$, $\phi_F$) corresponding, respectively, to the retardation of the oblique negative uniaxial film produced by holography, to the angle $\theta_F$ of its optical axis with respect to the normal to the screen, and to the angle $\phi_F$ of the projection of the optical axis in the plane of the screen.

If the compensator comprises several holographic films, each associated trio ($R_F$, $\theta_F$, $\phi_F$) must be optimized when taking the entire application into account.

The compensator is optimized by using, for example, a program with the name DINOS sold by Autronic-Melchers GmbH capable of modeling the optical transmission of a multilayer comprising a liquid-crystal cell, a Fuji film including a CTA, and a holographic film.

The optimization is accomplished, for example, by displaying the contrast conoscope obtained for a given configuration and by looking for that variation in the compensation films that will improve the viewing angle. The final solution—a better compensation structure—is obtained by successive approximations and iterations.

The holographic assembly may include one or more films each having a multilayer grating, each layer having its own orientation.

It is also possible to modify the CTA of negative uniaxial axis in the plane of the Fuji film. The modification consists, for example, in stretching the existing CTA for the commercial Fuji film so as to vary the value of the retardation, depending on the compensation to be applied to the Fuji film. This variation is introduced into the optimization steps described above.

FIG. 7 shows an alternative embodiment of FIG. 6, in which a holograph 24, 27 is bonded to each of the faces of the liquid-crystal cell 20, and the Fuji film 25, 26 is placed between a polarizer 23, 28 and a hologram 24, 27.

FIG. 8 shows an exploded view of the diagram of FIG. 6, comprising a non-uncrossed Fuji film combined with a negative uniaxial film having a retardation value of −25 nm.

The liquid-crystal screen 30 comprises, for example, a twisted nematic liquid crystal. This liquid crystal is sandwiched between two glass plates 31, 32 whose faces in contact with the liquid crystal have been treated by rubbing so as to define the orientation of the molecules in contact with these faces and their tilt with respect to the plane of the faces. The direction of rubbing on the face 31 is at −45° to the West-East direction. The direction of rubbing on the face 32 is at +45° to the same direction. Depending on the configuration, the polarizer 33 associated with the face 31 is oriented at 90° to the direction of rubbing on this face. The polarizer and the analyzer are therefore oriented at 90° to each other, possibly to within a few degrees thereof.

The analyzer 34 associated with the face 32 is oriented at 90° to the direction of rubbing on the face.

The compensation structure bonded to the face 31 comprises, for example, a first holographic film 35 (a negative uniaxial film) having a retardation value of around −25 nm, angles θ and φ having values of 90° and 135° respectively, a Fuji film 36 as described above, having an angle φ with a value of 315° and its CTA 37 having a retardation value of −80 nm and an angle θ of 0.

The compensation structure bonded to the face 32 comprises, for example, a second holographic film 38 having a retardation value of around −25 nm, angles θ and φ having values of 90° and 45° respectively, and a Fuji film 39 as described above having an angle φ with a value of 225° and its CTA 40 having a retardation value of −80 nm and an angle θ of 0.

Figure 4:
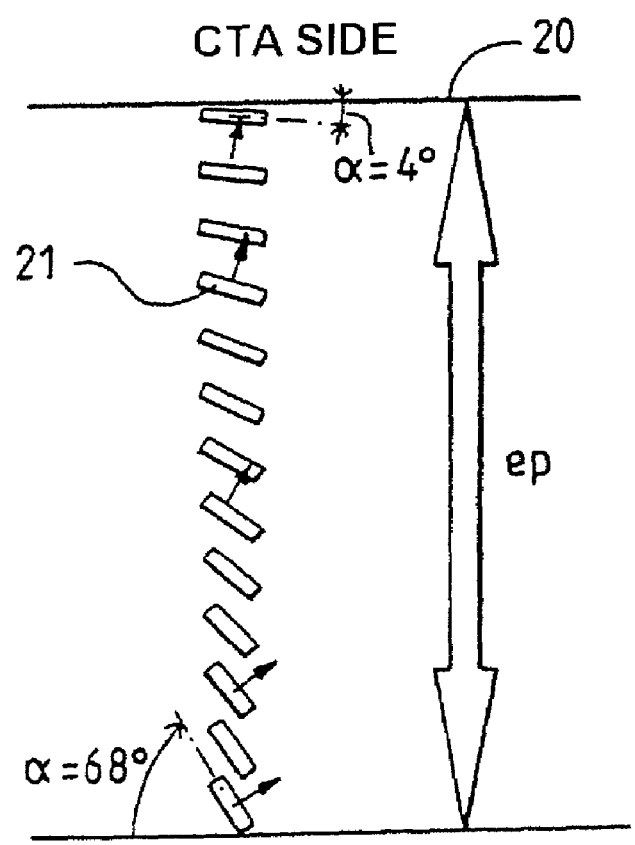
FIG. 4 shows schematically the structure of the Fuji-type film.

FIG. 9 shows the isocontrast curves of the compensated cell described in FIG. 8. The conoscope shows an improvement in the compensatability compared with the conoscope of FIG. 4, representative of the commercial Fuji film.

FIG. 10 is an exploded view of an example of a structure according to the invention in which the compensatabilities of the commercial Fuji film are improved using an oblique negative uniaxial film having a retardation of −25 nm.

Compared with FIG. 8, only the characteristics of the films 38 and 35 have changed.

The compensation structure bonded to the face 31 comprises, for example, a first holographic film 35 having a retardation value of around −25 nm, angles θ and φ having values of 120° and 135° respectively, a Fuji film 36 as described above having an angle φ equal to 315° and its CTA 37 having a retardation value of −80 nm and an angle θ of 0.

The compensation structure bonded to the face 32 comprises, for example, a second holographic film 38 having a retardation value of around −25 nm, angles θ and φ having values of 60° and 45° respectively, and a Fuji film 39 as described above having an angle p with a value of 225° C. and its CTA 40 having a retardation value of −80 nm and an angle θ of 0.

FIG. 11 shows the isocontrast curves of the compensated cell described in FIG. 10. Note there is an improvement over the conoscopes obtained in FIGS. 4 and 8.

FIG. 12 shows a variant in which the CTA of the Fuji film is improved, for example by modifying the value of its retardation.

FIG. 12 is an exploded view of a compensated liquid-crystal cell which differs from the structure described in FIG. 10 by the CTA.

The CTA of the Fuji film in this example, labeled 37 and 40, has a retardation value of −110 nm.

Figure 1:
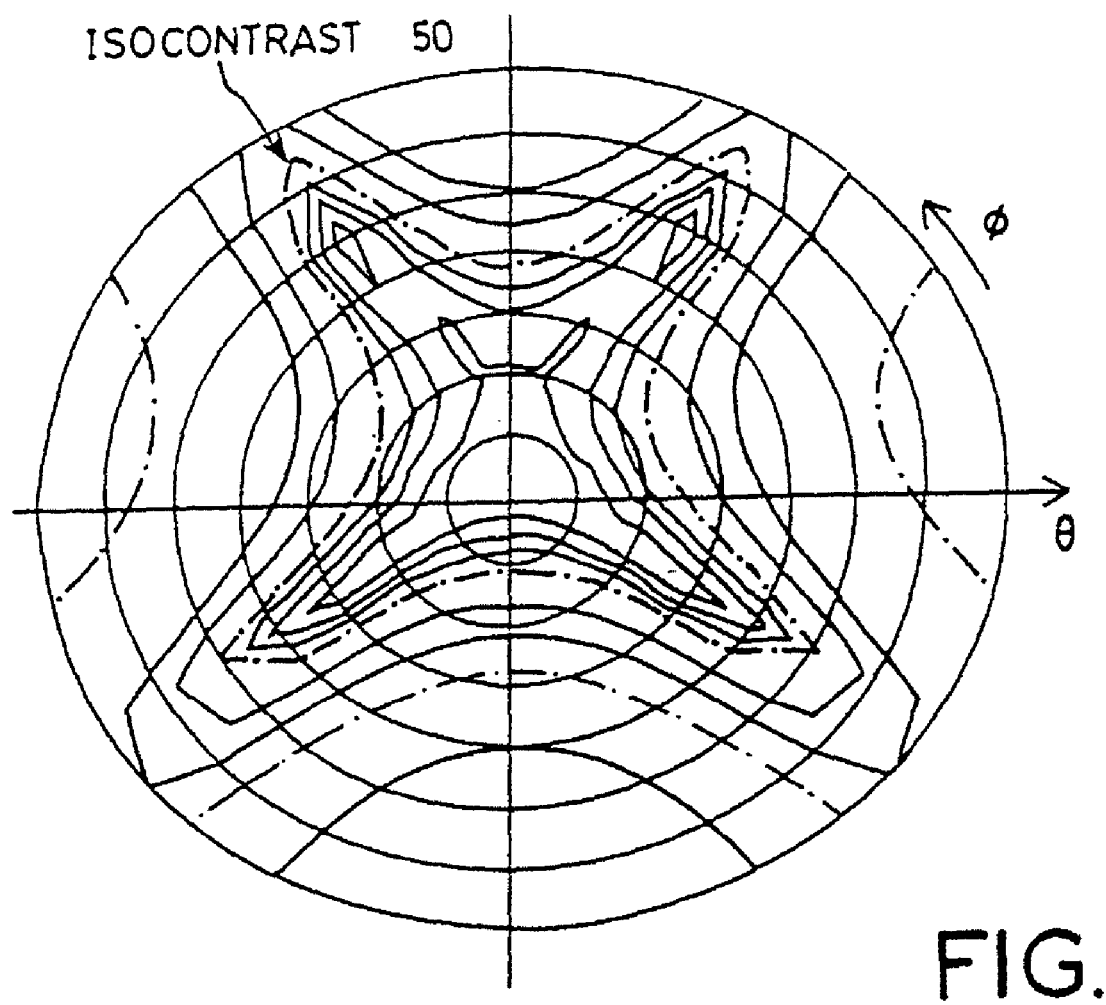
Figure 2A:
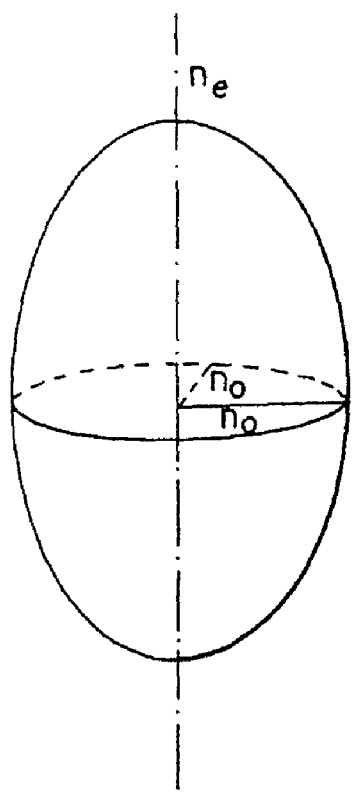
Figure 2B:
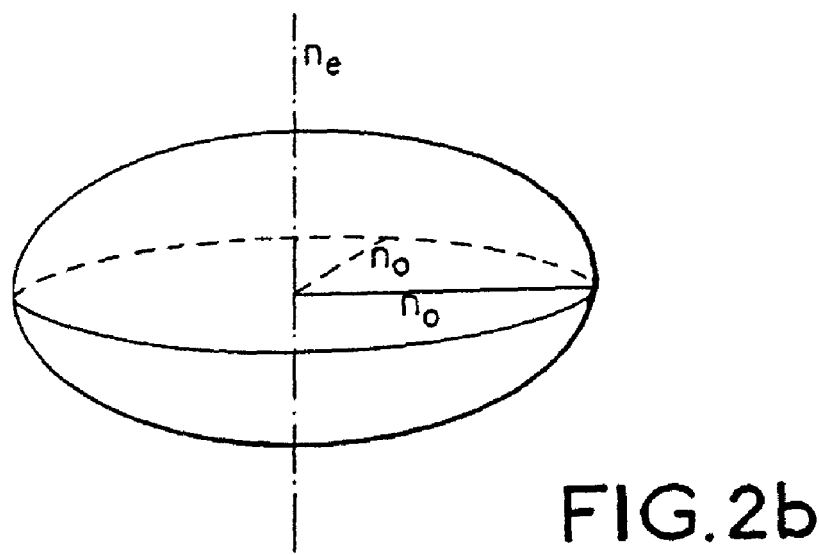
Figure 3:
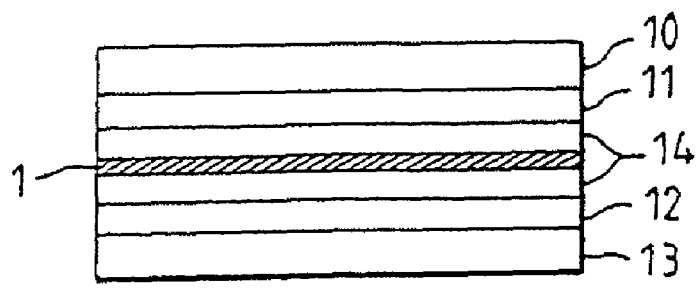
FIG. 3 shows schematically a structure of a compensated cell.

The isocontrast curves obtained with such a structuring and given in FIG. 3 show an improvement over the conoscopes obtained above.

Various arrangements of the holographic film and of the film to be improved may be imagined without departing from the scope of the invention, some of which are given in the table below as an illustration but in no way implying any limitation.

|   | Position of Fuji film | Position of the hologram |
|---|---|---|
| 1 | The Fuji film is placed between a face of the liquid-crystal cell and a face of a hologram | The hologram is placed between the polarizer and the Fuji film |
| 2 | The Fuji film is placed between the polarizer and the hologram | The hologram is placed between the liquid-crystal cell and the Fuji film |

Various arrangements of the compensation half-structures 1 and 2 are given in the table.

The liquid-crystal cell may be "flanked" on each side by a type-1 or type-2 compensation structure.

It may also face the 1-type structure on one side and the 2-type structure on the other side.

Without departing from the scope of the invention, the liquid-crystal cell may be of the twisted nematic (TN) type.

The invention claimed is:

1. A display device, comprising;
   a liquid-crystal cell element placed between two polarizers, at least one of the polarizers including an optical structure for compensating for variations in birefringence of said liquid crystal cell element according to the viewing angle;
   wherein an optical compensation structure comprises an oblique-axis film of polymerized liquid-crystal for at least partly compensating for undesirable effects of natural birefringence of the liquid crystal, combined with a film compensatability characteristic improving volume hologram of small retardation configured for improving the compensatability characteristics of said oblique axis film.

2. The device as claimed in claim 1, wherein said oblique-axis film is of a nematic or polymerized discotic liquid-crystal type.

3. The device as claimed in claim 1, wherein said hologram is a holographic film having an optical axis in the plane of the oblique-axis film.

4. The device as claimed in claim 1, wherein said hologram is a holographic film having an optical axis tilted with respect to the plane of this film.

5. The device as claimed in claim 1, wherein a value of the retardation of said volume hologram is less than −150 nm, preferably between −10 and − 100 nm.

6. The device as claimed in claim 1, wherein a holographic assembly includes at least two holographic films each comprising a multilayer grating, the layers of which have their own orientation.

7. The device as claimed in claim 1, wherein a first face of a liquid-crystal cell, which is configured to lie on the same side as an observer, is bonded to a first oblique-axis film which is itself bonded to a hologram and in that a second face of the liquid-crystal cell is bonded to a second oblique-axis film which is itself bonded to a hologram.

8. The device as claimed in claim 1, wherein a first face of the liquid-crystal cell, which is configured to lie on the same side as an observer, is bonded to a first hologram which is itself bonded to a first oblique-axis film itself and in that a second face of the liquid-crystal cell is bonded to a second oblique-axis film which is itself bonded to a hologram.

9. The device as claimed in claim 1, wherein a first face of the liquid-crystal cell, which is configured to lie on the same side as an observer, is bonded to a first hologram which is itself bonded to a first oblique-axis film itself and in that a second face of the liquid-crystal cell is bonded to a second hologram which is itself bonded to a second oblique-axis film.

10. The device as claimed in claim 1, wherein said oblique-axis film comprises a stretched plastic film of the CTA type having a negative uniaxial birefringence and in that the retardation value of this film is tailored to the holographic film and to the oblique-axis film.

11. The device as claimed in claim 10, wherein a liquid-crystal cell is of twisted nematic type.

12. The device as claimed in claim 11, wherein said device is used to compensate for the birefringence effects in display devices, such as microcomputer screens.

13. The device as claimed in claim 11, wherein a first face of a liquid-crystal cell, which is configured to lie on the same side as an observer is bonded to a first oblique-axis film which is itself bonded to a hologram and in that a second face of the liquid-crystal cell is bonded to a second oblique-axis film which is itself bonded to a hologram.

14. The device as claimed in claim 11, wherein a first face of the liquid-crystal cell, which is configured to lie on the same side as an observer, is bonded to a first hologram which is itself bonded to a first oblique-axis film itself and in that a second face of the liquid-crystal cell is bonded to a second oblique-axis film which is i self bonded to a hologram.

15. The device as claimed in claim 11, wherein a first face of the liquid-crystal cell, which is configured to lie on the same side as an observer is bonded to a first hologram which is itself bonded to a first oblique-axis film itself and in that a second face of the liquid-crystal cell is bonded to a second hologram which is itself bonded to a second oblique-axis film.

16. The device as claimed in claim 10, wherein a first face of a liquid-crystal cell, which is configured to lie on the same side as an observer, is bonded to a first oblique-axis film which is itself bonded to a hologram and in that a second face of the liquid-crystal cell is bonded to a second oblique-axis film which is itself bonded to a hologram.

17. The device as claimed in claim 10, wherein a first face of the liquid-crystal cell, which is configured to the same side as an observer, is bonded to a first hologram which is itself bonded to a first oblique-axis film itself and in that a second face of the liquid-crystal cell is bonded to a second oblique-axis film which is itself bonded to a hologram.

18. The device as claimed in claim 10, wherein a first face of the liquid-crystal cell, which is configured to lie on the same side as an observer, is bonded to a first hologram which is itself bonded to a first oblique-axis film itself and in that a second face of the liquid-crystal cell is bonded to a second hologram which is itself bonded to a second oblique-axis film.

19. The device as claimed in claim 1, wherein said oblique axis film comprises a multilayer of discotic molecules and a negative uniaxial firm having n optical axis perpendicular to a retardation plane.

20. A display device, comprising;
- polarizers disposed on either side of a liquid crystal cell element;
- an optical structure associated with at feast one of the polarizers, the optical structure being configured to compensate for variations in birefringence of the liquid crystal cell element according to the viewing angle, and comprising:
- a polymerized liquid-crystal oblique-axis film configured to compensate for birefringence in the liquid crystal cell element, and
- a small retardation, film compensatability characteristic improving volume hologram recorded to have a predetermined relationship with respect to characteristics of the oblique-axis film and to modify the characteristics of the oblique-axis film.

* * * * *